United States Patent

Helms et al.

[11] Patent Number: 6,144,695
[45] Date of Patent: Nov. 7, 2000

[54] METHOD AND APPARATUS FOR REDUCING NEAR-END CROSSTALK (NEXT) IN DISCRETE MULTI-TONE MODULATOR/ DEMODULATORS

[75] Inventors: Howard David Helms, Brookside; Robert Raymond Miller, II, Township of Morris, Morris County; Richard Robert Shively, Convent Station, all of N.J.

[73] Assignee: AT&T Corp., New York, N.Y.

[21] Appl. No.: 08/997,176

[22] Filed: Dec. 23, 1997

[51] Int. Cl.[7] .............................. H04B 1/38; H04B 15/00; H04L 5/16
[52] U.S. Cl. ......................... 375/222; 375/285; 375/346; 370/201; 370/480; 370/503; 379/93.01; 379/93.08; 379/406; 379/410; 379/417; 455/295; 455/501
[58] Field of Search ................................... 375/222, 285, 375/346, 356; 370/201, 286, 480, 503, 514, 515; 379/399, 406, 410, 416, 417, 90.01, 93.01, 93.08; 455/3.1, 5.1, 501, 502, 295

[56] References Cited

U.S. PATENT DOCUMENTS

| 5,479,447 | 12/1995 | Chow et al. | 375/260 |
| 5,519,731 | 5/1996 | Cioffi | 375/260 |
| 5,521,949 | 5/1996 | Huang et al. | 375/377 |
| 5,668,802 | 9/1997 | Chalmers et al. | 370/276 |
| 5,673,290 | 9/1997 | Cioffi | 375/260 |
| 5,680,394 | 10/1997 | Bingham et al. | 370/294 |
| 5,887,032 | 3/1999 | Cioffi | 375/257 |
| 5,970,088 | 10/1999 | Chen | 375/222 |
| 6,009,122 | 12/1999 | Chow | 375/260 |
| 6,014,412 | 1/2000 | Wiese et al. | 375/346 |
| 6,044,107 | 3/2000 | Gatherer et al. | 375/222 |

OTHER PUBLICATIONS

American National Standards Institite, Standards Document—T1.413–1995; "Network and Customer Installation Interfaces—Asymmetric Digital Subscriber Line (ADSL) Metallic Interface"; Approved Aug. 18, 1995, pp.: cover page; two inside sheets; i–vi; 1–115.

Primary Examiner—Stephen Chin
Assistant Examiner—Michael W. Maddox

[57] ABSTRACT

This invention reduces near-end crosstalk between identical discrete multi-tone (DMT-type) modems by introducing the following modifications to modems at a central office or a subscriber premises. The modifications include: a mechanism for aligning the frames of all modems at the central office (CO), a mechanism for aligning the frames transmitted by the subscribers' modems with the frames received by those modems, and lengthening the DMT frame to include a cyclic prefix. The cyclic prefix to a frame has been made longer than twice the maximum round-trip delay, that is, the delay between the central office and the most distant subscriber to be served. By making adjacent DMT carrier frequencies be orthogonal to each other, the aforementioned modifications will reduce both Near End Cross-Talk (NEXT) and Leakage-Excited Cross-Talk (LEXT). These benefits apply to modems at both the central office (CO) and subscriber ends of the communication path (for example, a high capacity twisted-pair wire).

26 Claims, 7 Drawing Sheets

METHOD AND APPARATUS FOR REDUCING NEAR-END CROSSTALK (NEXT) IN DISCRETE MULTI-TONE MODULATOR/DEMODULATORS

BACKGROUND OF THE INVENTION

1. Technical Field

This invention relates to the field of providing high speed digital data services to a digital service subscriber and, more particularly, to so-called asymmetric digital subscriber line (ADSL) services and to a method of reducing near-end crosstalk in discrete multi-tone (DMT) modems located at a central office and at the subscriber's premises for providing ADSL services.

2. Description of the Related Arts

In the field of cable television, cable modem technology is emerging which provides increased bandwidth services to the home. Cable television equipment manufacturers are promoting the upgrading of cable television distribution plant to comprise so-called hybrid optical fiber and coaxial cable (hybrid fiber/coax) facilities. It is anticipated in the cable field that bandwidths to and from the subscriber can be increased so that bi-directional voice and data services may be provided in addition to traditional cable television programming. In the related field of telecommunications, there exists a considerable amount of embedded distribution plant comprising high capacity twisted wire pair cable. Historically, each cable pair was specially loaded with inductance coils at periodic intervals along the path from a serving central office to the subscriber's premises to improve voice telephony performance. The inductance loading countered the effects of the high capacity cable and provided a flat bandwidth on each twisted cable pair at voice frequencies. On the other hand, frequencies higher than voice bandwidth were intentionally attenuated to such a degree that the twisted wire cable pair was unusable for other than a voice channel. When the loading is removed, the twisted cable pair bandwidth improves and becomes more comparable to that of coaxial cable.

Figure 1:
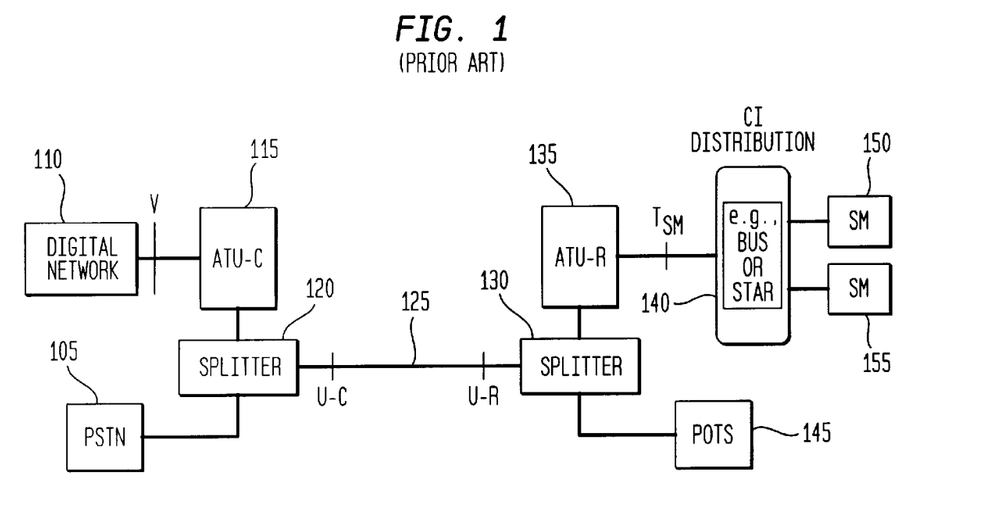
FIG. 1 is a system reference model showing the primary components of an asymmetric digital subscriber line metallic interface between a subscriber and a central office and between the central office and a digital or public switched telecommunications network.

An emerging technology in the telecommunications arts that competes with cable modem technology is so-called asymmetric digital subscriber line (ADSL) technology. Referring to FIG. 1 taken from American National Standards Institute standards document T1.413-1995, there is shown a public switched telecommunication network (PSTN) 105 and a digital network (for example, a frame relay, asynchronous transfer mode (ATM), Internet or other digital network) 110 at the left. At the right is the subscriber's premises. The digital network 110 is coupled via a logical interface V to an ADSL transceiver unit (ATU) at the serving central office (C). Also at a serving central office are located a splitter 120 for splitting the telecommunications services from the digital services, typically based on frequency. For example, a voice channel may still be preserved at from 0–4000 Hz. The splitter function may be integrated into ATU-C 115 (and at the remote subscriber site, into ATU-R 135). Interface U-C represents the subscriber loop (twisted pair) interface at the central office C and interface U-R represents the subscriber loop interface at the remote subscriber terminal end of the twisted wire cable pair or other facility 125. Facility 125 may comprise, for example, a twisted wire pair or a hybrid optical fiber/twisted wire pair facility or other wired or wireless facility having comparable or greater bandwidth. Service module (SM) 150 or 155 at the remote location may comprise an intelligent telecommunications terminal, a personal computer, a television terminal, an energy management system, a security system or other service module known in the art. Plain old telephone service (POTS) module 145 represents a traditional telecommunications terminal such as a facsimile terminal, voice bandwidth modem or standard telephone. Facility C1 distribution 140 within the subscriber premises may comprise, for example, a bus such as a home bus or a star network or other configuration. By bus as used herein is intended a communications link that may be wired or wireless connecting a plurality of devices together. The bus may be arranged so that there is contention for access to the bus according to priorities or be provided sufficient capacity to alleviate the likelihood of contention. Interface T represents the interface between a service module (SM) and/or a bus/star 140 to other service modules (SM's).

Figure 2A:
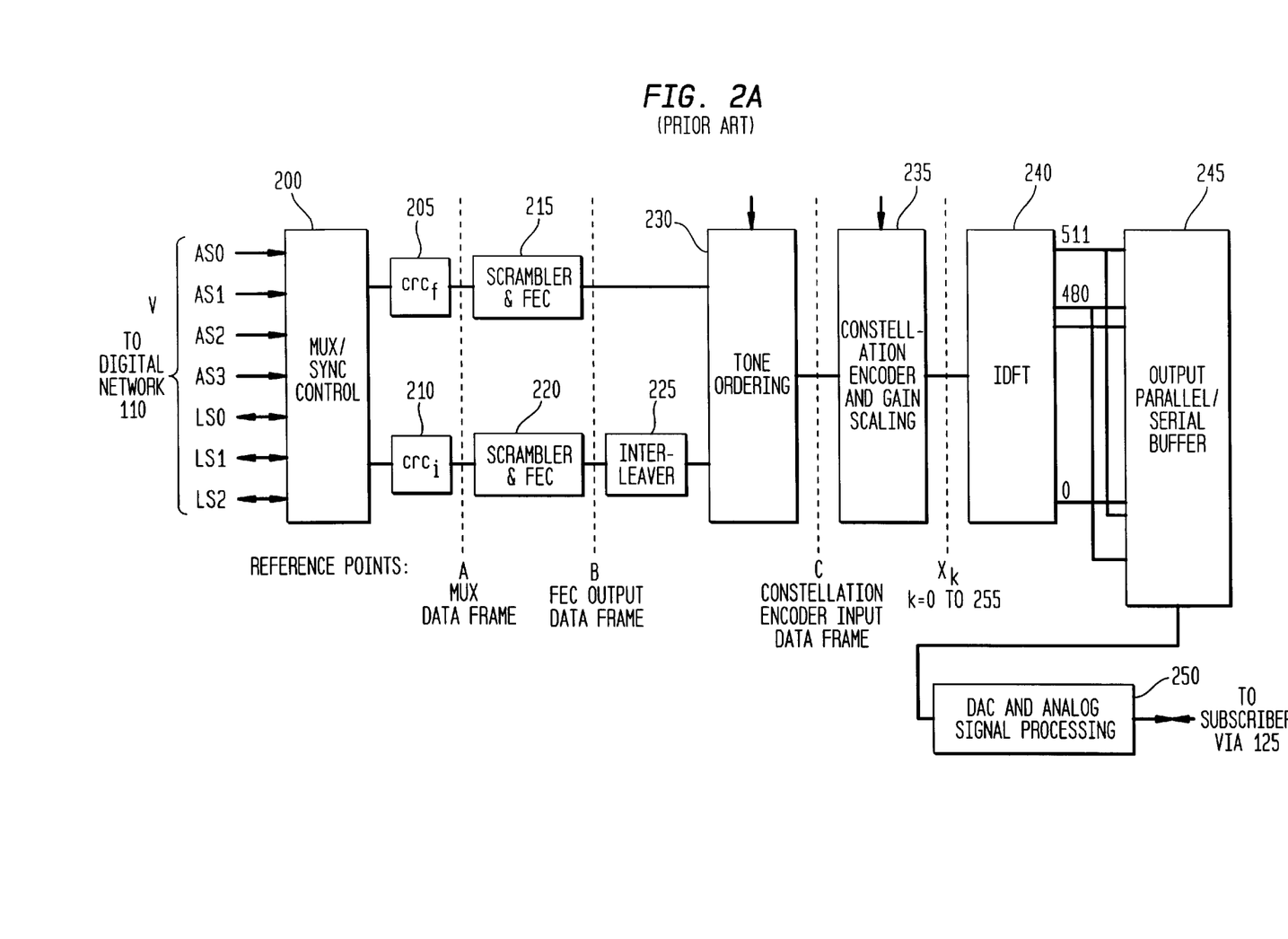
FIG. 2A is a functional block diagram of an ADSL transmitter unit located at a central office and FIG. 2B is a functional block diagram of an ADSL receiver unit located at a central office.
Figure 2B:
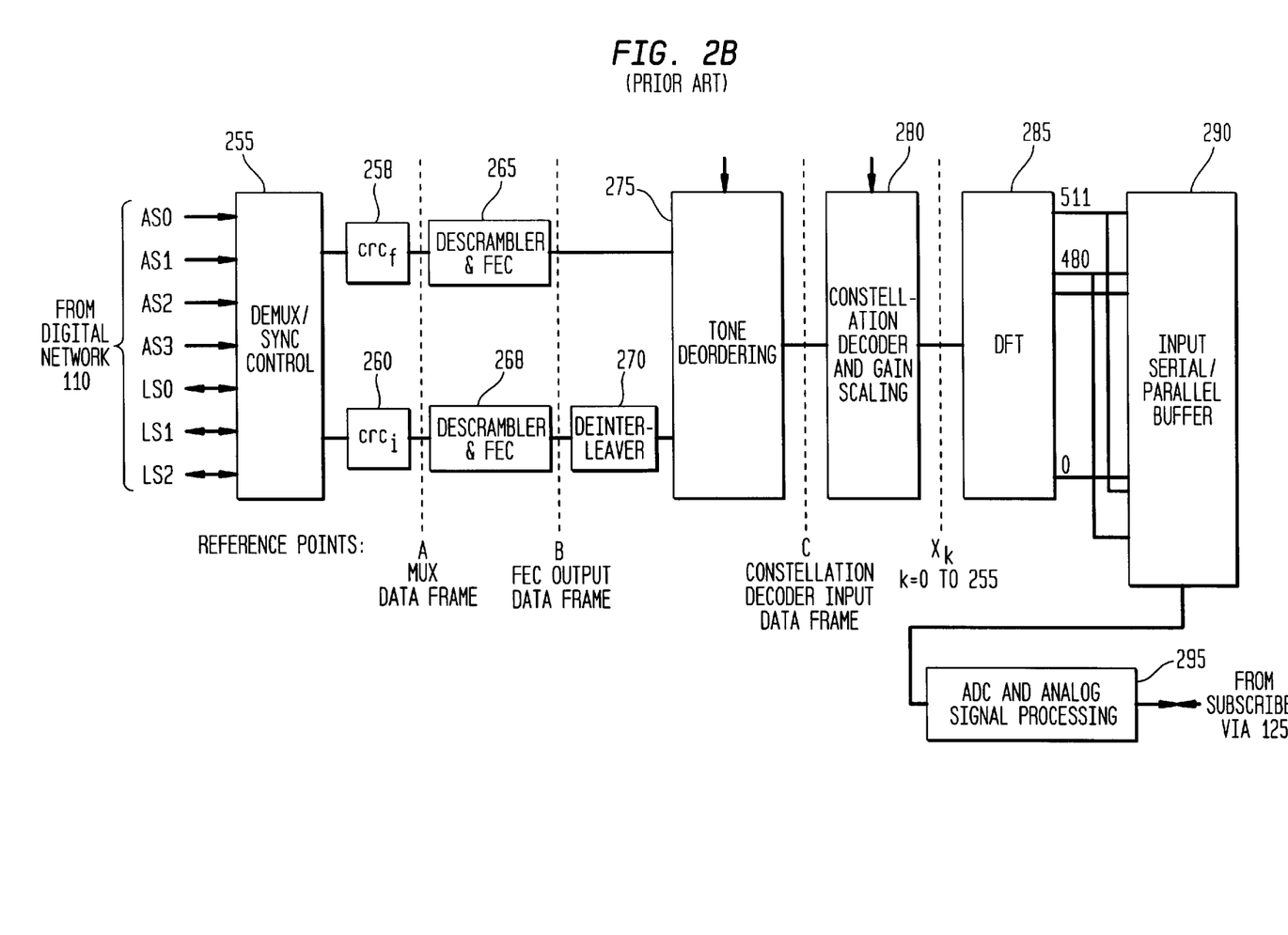

Referring to FIGS. 2A and 2B, there are shown respectively an ATU-C transmitter whose reference diagram is taken from A.N.S.I. T1.413-1995 and an ATU-C receiver whose reference diagram is derived therefrom. In FIG. 2A, there is shown an expanded functional block diagram of the transmitter portion of ATU-C 115 of FIG. 1. A multiplexer/sync control unit 200 provides the interface to the digital network 110. Various high speed data rate links AS0, AS1, AS2 and AS3 at multiples of 1.536 Mbits/sec are provided toward digital network 110. In particular, each AS link represents an independent downstream simplex (unidirectional downstream) bearer of data traffic. Lower speed data services are also shown and represented by LS0 (16 or 64 kbits/sec), LS1 (160 kbits/sec) and LS2 (384 or 576 kbits/sec). Each LS link may represent a duplex bearer (bi-directional) carrying both downstream and upstream traffic or, in the alternative, a unidirectional simplex bearer.

CRC 205 and CRC 210 represent cyclic redundancy check in each direction of transmission. Scrambler and forward error correction 215, 220 represent scrambling and forward error correction, for example, using Reed-Solomon error correction coding, in each direction of transmission. Interleaver 225 provides a data interleaving function as is further described in A.N.S.I. T1.413-1995, incorporated by reference as necessary. Tone ordering function 230 provides tone selection and control functions as are also described by A.N.S.I. T1.413-1995. Constellation encoder (if used) and gain scaling functions are represented by block 235. The inverse discrete Fourier transform function applied for data modulation is represented by block 240. Two data directions are shown coupling IDFT 240 and output parallel to serial buffer 245 where a cyclic prefix is added to each data frame. Finally, a digital to analog converter and analog signal processing function are represented by block 250 which interfaces the subscriber facility 125.

Referring to FIG. 2B, the ADSL receiver at the central office is shown. The horizontal arrows are reversed in direction from FIG. 2A. Data demultiplexer 255 interfaces the digital network 110. Descrambler 265, 258, deinterleaver 270, decoder 280, DFT 285, input serial to parallel buffer 290 and analog to digital converter 295 represent the significant changes in function between ATU-C transmitter and receiver.

Figures 3, 4:
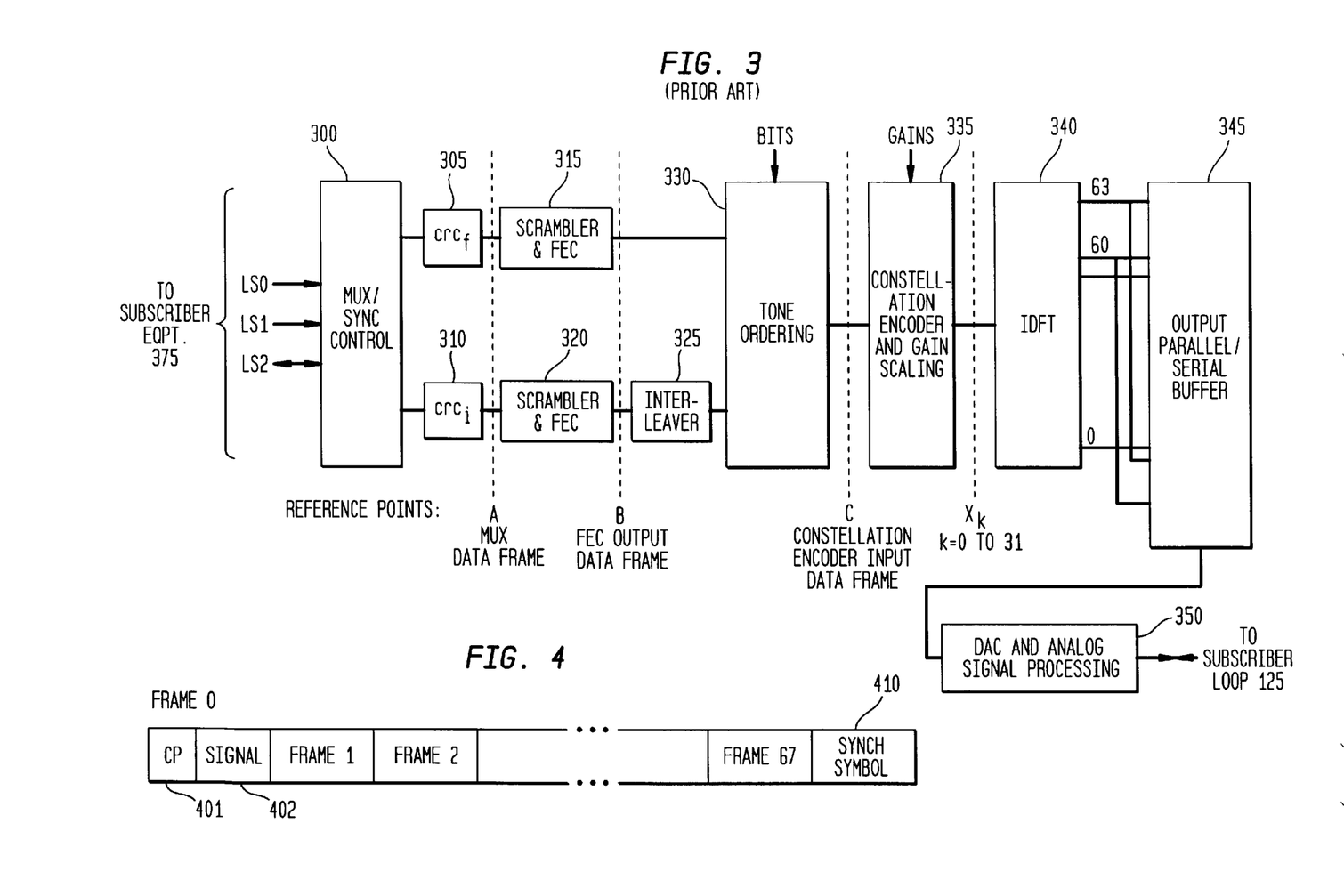
FIG. 3 is a functional block diagram of an ADSL transmitter unit located at a remote subscriber premises location.
FIG. 4 is a diagram of a proposed frame/superframe structure for an ADSL modem and the components thereof such as frame length, cyclic prefix and synch symbol that may be modified according to the present invention to prevent near end crosstalk.

Referring to FIG. 3, at a subscriber terminal, the transmitter (ATU-R) is similarly configured as ATU-C but it is assumed that channels operate at LS0, LS1 or LS2 toward the subscriber's equipment. Cyclic redundancy checks 305/310 are provided for each direction of transmission to/from subscriber equipment 375. Scrambler and forward error correction circuits 315 and 320, for example, using Reed-Solomon error correction coding, are provided for especially secure data transmission. An interleaver 325 is provided in one transmit path. Tone ordering circuitry 330 is necessary for generating and ordering the discrete multi tones of the discret multi-tone (DMT) modem. The constellation encoder and gain scaler 335 may or may not provide a form of trellis data encoding and gain scaling for controlling the tone ordering. IDFT block 340 performs an inverse discrete Fourier transform for modulating the digital data. The output parallel to serial buffer 345 is provided for providing parallel to serial conversion to a digital to analog converter and analog signal processing interface 250 which interfaces the subscriber loop 125.

The analog signal framing (FIG. 4) used in ADSL technology is obtained by passing quadrature amplitude modulation (QAM) samples through a D/A converter 250 or 350. These samples are arranged in a superframe of 69 frames (frames 0–68) totaling approximately 17 milliseconds. Altogether 512 samples (256 real and 256 imaginary, 0–511) are taken of the data. An additional 32 samples contain a cyclic prefix making a total of 544 samples in each frame. The cyclic prefix CP 401 is added, for example, to signal 402 of frame 0 (FIG. 4) at the output parallel/serial buffer 245 and 345 shown in FIGS. 2A and 3 respectively.

Every 69th frame contains a pseudo-random number (PRN) sequence with a nominal length of 544 samples. This PRN sequence (the so-called synch symbol) permits recovery of the frame boundary after interruptions.

The sub-carrier tones are spaced at 4.3125 kHz according to the ANSI Standard T1.413-1995 and at carrier 64 where the frequency is 276 kHz, a pilot carrier is inserted. The data modulated on that pilot is a constant bit value (for example, 0,0). Other details of frame construction, data modulation, tone ordering and the like may be found in the Standard and are not believed to be particularly relevant to the principles of the present invention.

Near-end crosstalk, hereinafter referred to as NEXT, is a potentially severe problem for operating multiple Digital Subscriber Line (DSL) modems over twisted-pair wires between a Central Office (CO) and a subscriber's location. NEXT occurs when the transmissions from one or more modems, particularly those at the central office, capacitively couple into each other's twisted-wire pairs and impair the ability of those modems to receive transmissions from the other end of the twisted-wire pairs. Moreover, with severe NEXT, a subscriber modem cannot receive transmissions from its transmitting central office modem. This problem is most severe when a modem operates in full-duplex mode in which transmission is simultaneously bi-directional at all frequencies.

Cables that serve subscribers and terminate at a central office can comprise thousands of twisted wire pairs that are bundled together in a limited cross-sectional (typically circular) area. Electrical signals traveling on the twisted pairs can easily electrically couple into physically proximate twisted pairs, consequently, near end crosstalk has a detrimental effect on bit error rate. Since the concept behind ADSL technology is to optimize bandwidth use, the phenomenon of near end cross-talk limits any one of three factors: the distance a subscriber can be from the central office, the digital data rate of service and the bit error rate of any digital data service. As the number of subscribers increase to ADSL technology, the likelihood will increase that an ADSL subscriber will be served by a twisted wire cable pair proximate to that of another subscriber and that frequencies from one twisted wire cable pair will adversely impact the signal to noise ratio of digital signals on an adjacent or proximate cable pair. Consequently, there is a need in the art to alleviate the effects of NEXT.

One way to reduce NEXT might be to assign cable pairs to subscribers in such a way that subscribers to ADSL services are not in the same bundles as other subscribers. Of course, at some point in time, as subscribers to ADSL increase, so does the likelihood that cable pair assignment in such a manner cannot be accomplished. Thus, there is a need in the art for reducing NEXT in ADSL services.

SUMMARY OF THE INVENTION

The present invention offers the possibility of substantially improving one or more of the following parameters: distance of the subscriber from the central office, data rate, and error rate. For example, the distance of the subscriber from the central office may be increased while the data rate and error rate are held constant. According to the principles of the present invention, the framing suggested by ANSI T1.413-1995 is modified and frame alignment is recommended for all frames transmitted by the central office. Also, all frames transmitted by subscriber modems should be aligned to coincide with received frames. An echo canceler may be applied to cancel near end echo as will be further discussed herein. Interspersing transmit frequencies (individual frequencies or bands) between central office and subscriber modems may further reduce the effects of near end crosstalk.

In particular, in accordance with the present invention, the length of the cyclic prefix prepended to each frame of a DMT frame should be increased to a value that is at least the length of the sum of 1) the maximum round trip delay from a central office to a subscriber and 2) the delay required to prevent intersymbol interference or ISI (according to the ANSI standard, 32 samples or 14.5 microseconds to prevent ISI). For example, if the sampling rate is maintained at approximately 2.2 megaHertz and if the maximum round-trip delay is approximately 80 microseconds for an 18,000 foot twisted-wire pair loop, one might increase the cyclic prefix to about 184 samples from the recommended 32 samples or the equivalent of 81.3 microseconds of signal duration or even higher depending on concerns about ISI.

Also, it is advantageous to increase the length of the frame proportionately to the increase in the cyclic prefix. For example, if the cyclic prefix is lengthened from 14.5 microseconds to 81.3 microseconds, then the frame should be lengthened from 250 microseconds to approximately 1 millisecond. If the same sampling rate is maintained (at around 2.2 megaHertz), then other parameters will change accordingly. If the frame length is increased to 1 millisecond, the number of sample points of the IDFT should increase from 512 to, for example, 2048, the carrier spacing should decrease, for example, from 4.1325 kHz to 1.089998 kHz and the DMT's sampling rate should increase slightly from 2208 kHz to 2263 kHz. These numbers are representative only, and other practitioners of the art may deviate depending on the application.

It is a further principle of the present invention to align frames transmitted from the central office toward the subscriber. All frames transmitted by all central office modems are aligned and synchronized to begin at the same time as they are transmitted toward subscribers. That is, all frames transmitted by all central office modems to all subscribers (especially served on the same cable of twisted wire pairs) start and end at the same times. One way to accomplish the alignment is to provide a common shared timing signal to all CO modems from a common source. For example, the signal may comprise a train of narrow, for example, 1 microsecond pulses spaced by the period of a frame (for example, one millisecond). Each central office modem then would align its frames that are transmitted toward respective subscribers over different twisted wire cable pairs with this pulse train.

The pulse train from the common source may be accompanied by a higher frequency signal (for example, a sinusoid or a pulse train at the frequency specified in Section 6.9 of ANSI T1.413-1995) to which each modem could be synchronized. Alternatively, the pilot tone of 276 kHz specified at Section 6.9.1.2 might by applied as the shared resource. Either alternative will save the costs of providing an oscillator within each central office modem.

Figure 6:
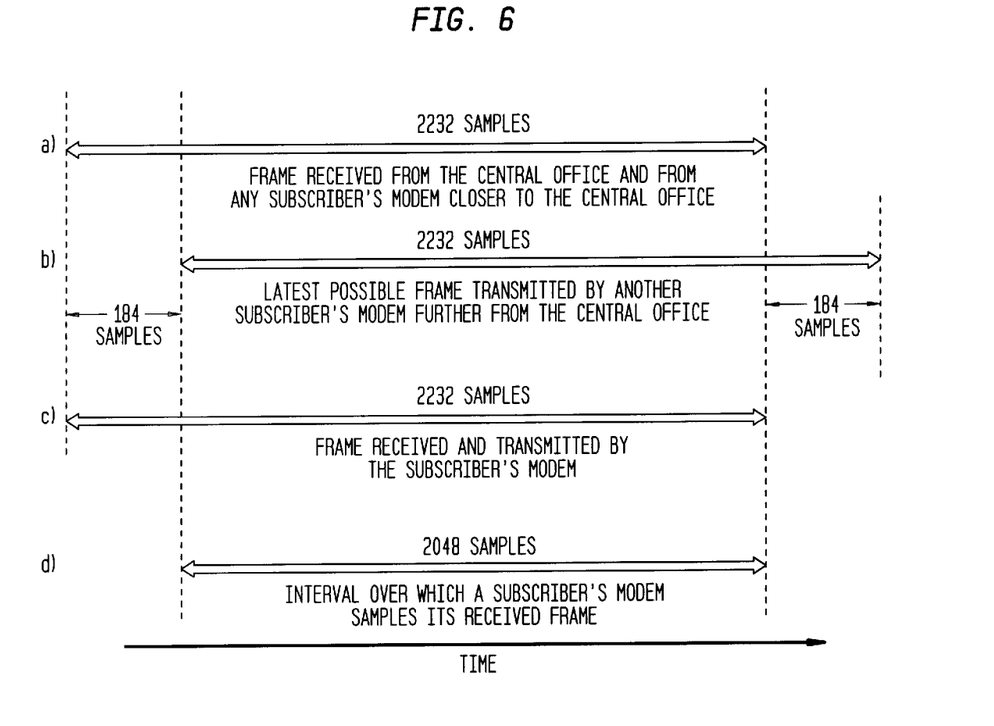
FIG. 6 shows the result of the frame lengthening and alignment principles of the present invention as applied at a subscriber modem.

Now, it is a further principle of the present invention that all frames transmitted by the subscriber's modem toward the central office modem be aligned with the frames that it receives from the central office. Its transmitted frames should coincide with frames it receives from the central office as may be seen from the FIGS. 6a) and 6c).

Figure 5:
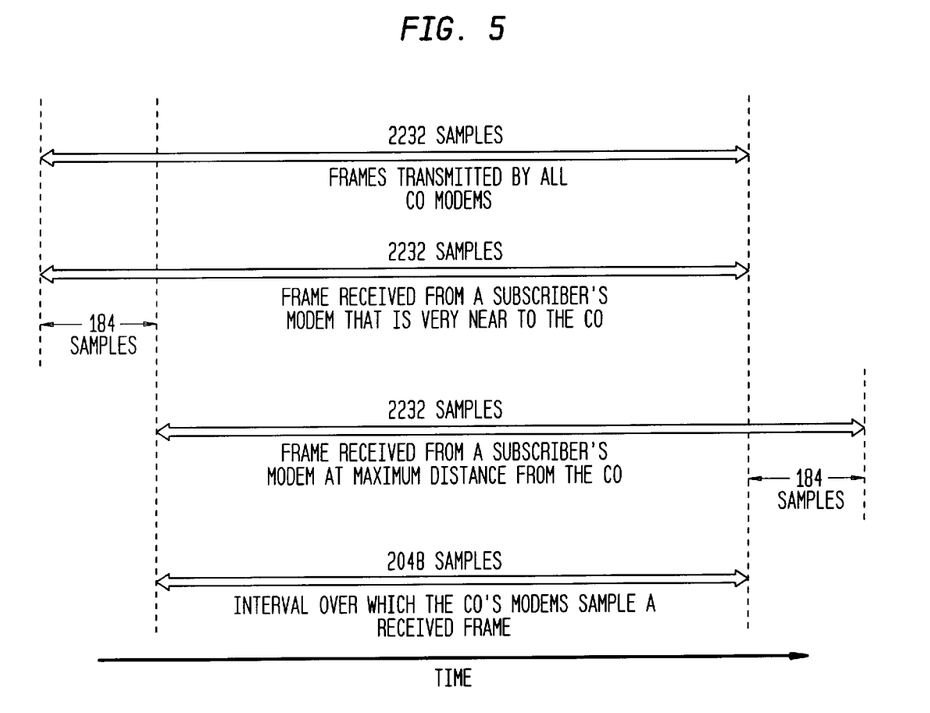
FIG. 5 shows the result of frame lengthening and alignment principles of the present invention as applied at a central office modem.

With the frames aligned as described and per FIG. 6 and with the lengthened cyclic prefix (for example, 184 samples long), each central office modem samples its received frame wholly within the frame 1) received from its subscriber's modem and 2) transmitted by all other subscriber's modems as in FIG. 5 which shows that each central office modem samples its received frame wholly within the frames transmitted by all other subscribers' modems.

Referring again to FIG. 5, there is shown the frames that a central office modem would receive if the principles of the present invention were followed for two extremes of round-trip delay. When the subscriber is almost adjacent to the central office, the leading edge of the subscriber frame is received 184 samples before the leading edge of the central office sampling. The leading edge of the distant subscriber's frame coincides with the leading edge of the CO's sampling. For these and any delays between these extremes, the CO modem receiver takes its samples entirely within both the frame received from all subscribers' modems and the frames transmitted by all modems at the central office. Thus, a frame transmitted at one carrier frequency is guaranteed to not interfere with a frame received at another carrier frequency. Taking samples from inside the frame preserves the orthogonality of the sinusoids in the discrete Fourier transform (DFT), since the modem's DFT modulator operates on an integral number of periods of each carrier frequency. NEXT is reduced if not eliminated via this orthogonality requirement.

Finally, it is a further principle of the present invention that the central office and subscriber modems' transmit frequencies may be interspersed. For example, one or more bands of frequencies toward the subscriber from the central office may be interspersed with a band of frequencies in the return direction from the subscriber modem to the central office. At the extreme, all odd multipled carriers may be used in the downstream path from the central office and even multipled carriers be used in the upstream path (or vice versa). That is, for example, odd multiples of 1.089998 kHz may be used in the downstream and even multiples in the upstream path exclusive of any band reserved for POTS telephony. This even-odd distribution of upstream and downstream frequencies offers the advantage of degrading nearly symmetrically as distance from the central office and/or NEXT interference increase.

Referring again to FIG. 6, it may be seen that similar benefits are obtained at a subscriber modem. A subscriber's modem will sample only inside the frames transmitted by itself and by other subscriber modems of the same type. Again, sampling inside the frames preserves the orthogonality of sinusoids at adjacent frequencies.

Further advantages and features of the present invention will be understood from studying the accompanying drawings and from reading the following detailed description thereof.

DETAILED DESCRIPTION OF THE INVENTION

The basis for central office or subscriber modem design according to the present invention is the Discrete Multitone (DMT) modem standardized in ANSI Standard T1.413-1995 for an Asymmetric Digital Subscriber Line (ADSL). The terms used herein conform to their usage in the T1.413-1995 standard document. Frame and superframe are defined by Sect. 6.2.1.1; pilot frequency is defined in Sect. 6.9.1.2; the inverse discrete Fourier Transform (IDFT) is defined by Sect. 6.9.2; the synch symbol is shown in FIG. 3 and is defined by Sect. 6.9.3; and cyclic prefix is defined by Sect. 6.10. This invention makes the following changes to the Standard:

Aligning the Frames Transmitted by the Central Office (CO) Modems

The frames transmitted by all central office (CO) modems (for example, that portion of ATU-C 115 of FIG. 1 and FIG. 2 facing the subscriber loop 125) according to the present invention are aligned at the central Office; that is, the frames transmitted by all CO modems start and end at the same times. To achieve this alignment, the CO modems may share a common timing signal. This signal may consist of a train of narrow (for example, 1 μsec.) pulses spaced by the period of the frame. Each CO modem would align its frames with this pulse train. This pulse train could be accompanied by a higher-frequency signal (for example, a sinusoid or a pulse train) to which each modem may be synchronized. For example, a pulse train at the sampling frequency specified in Section 6.9.3 for the synch symbol of the ANSI standard might be shared among the CO modems covered by this invention. Alternatively, a sinusoid at the pilot frequency specified in Section 6.9.1.2 of the ANSI standard might be shared. Either alternative would save costs by removing the need for each CO modem to contain its own oscillator or other means for producing a synchronization signal.

Aligning the Transmitted and Received Frames at the Subscribers' Modems

The subscribers' modem (for example, ATU-R 135 of FIG. 1) disclosed in the present invention is designed to align the frames that it transmits (per ATU-R transmitter of FIG. 3) with the frames that it receives, so that its transmitted frame coincides with its received frame. This is illustrated by the $2^{nd}$ arrow from the bottom c) in FIG. 6. The reason for this alignment will be explained subsequently herein.

Lengthening the Cyclic Prefix and the Frame

To implement the changes in alignment at the central office and at the subscriber, the lengths of both the DMT frame and the cyclic prefix contained within the frame are increased from the values specified in the ANSI standard according to the principles of the present invention. The cyclic prefix should be made at least as long as the sum of 1) the maximum round-trip delay from the central office to a subscriber that is the farthest away from the central office (e.g., approximately 80 $\mu$sec. for an 18,000 foot twisted-wire cable pair) and 2) the delay required to prevent intersymbol interference (ISI). This delay, for example, is approximately 14.5 microseconds assuming a 32 sample cyclic prefix. Since the ISI prevention delay is much smaller than the maximum round trip delay, the ISI prevention delay may be considered to be immaterial; nevertheless ISI is of concern and should be considered. Although the cyclic prefix could be increased without lengthening the frame, it is advantageous to increase the frame length proportionately to maintain the fraction of time during which data is sent. Other modifications become proportionately useful, for example, decreasing the spacing between carrier frequencies of either the central office or subscriber DMT modem. The modified cyclic prefix is preferably inserted via the output parallel to serial buffers 245 and 345 of the CO and subscriber modems.

Interspersing the CO and Subscribers' Modems' Transmit Frequencies

Figure 7:
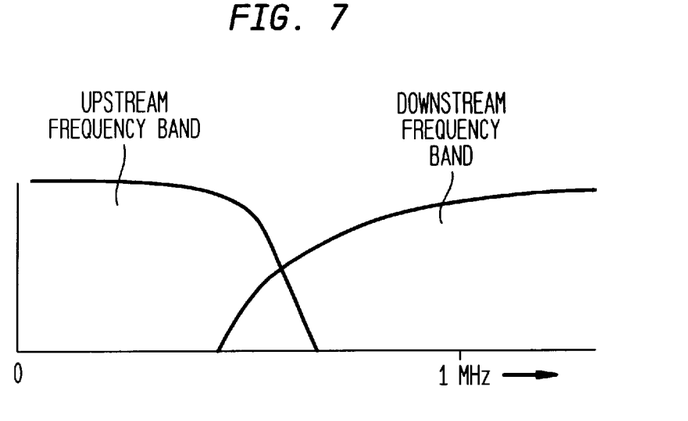
FIG. 7 shows an example of a frequency interspersing step of the present invention as applied to splitting the frequency bands of upstream and downstream transmission.
Figure 8A:
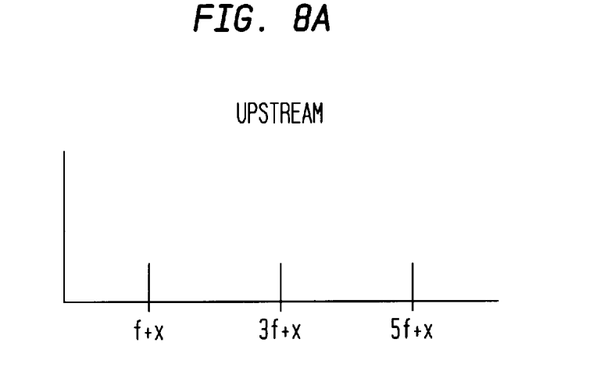
FIG. 8 shows an example of the frequency interspersing step of the present invention as applied to utilizing every other carrier frequency for upstream or downstream transmission.
Figure 8B:
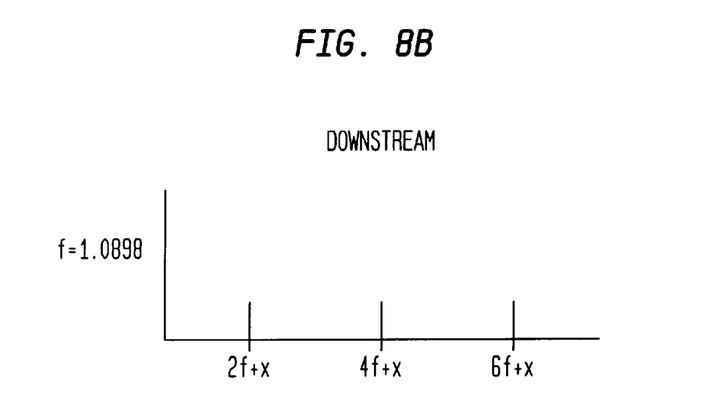

Optionally, the frequencies used by the central office and subscriber modems can be interspersed—either individually or in groups—to virtually eliminate near end crosstalk (NEXT), provided that the frames are aligned as described above. Referring to FIG. 7, a band of frequencies may be reserved for downstream transmission and a complimentary band of all remaining frequencies may be used for upstream transmission. Referring to FIG. 8, alternatively, all of the central office modems might transmit on the even values of the frequency index, while all of the subscribers' modems might transmit on the odd frequency-indices (or vice versa) where the central office transmit on even is shown in FIG. 8(b) and the subscriber trasnmit on odd is shown in FIG. 8(a). If the carrier frequency separation is 1.0898 kilohertz then odd multiples plus a reserved band x may be used, for example, for upstream transmission and even multiples for downstream, where f is the frequency separation and x the reserved band. Although either of these interspersing approaches would halve the number of carrier frequencies available to each direction of transmission, it would virtually prevent NEXT between all modems utilizing this invention without requiring the use of band-separating filters or echo cancellers. Besides saving costs, interspersing could utilize bandwidth symmetrically and consistently. For example, each direction of transmission could use a constant fraction (such as 50%) of the available bandwidth.

Example of Selecting the Parameters of a Modem According to the Present Invention If the sampling rate (2.2 megaHertz) is maintained approximately the same as in the ANSI standard, the ANSI standard's parameters may be modified as follows: 1) Increase the DMT frame length from 250 $\mu$sec. to 1 msec.; 2) Increase the number of points in the DMT's Discrete Fourier Transform (DFT) from 512 to 2048; 3) Increase the number of samples in the DMT's cyclic prefix from 32 to 184; 4) Decrease the DMT's carrier-frequency separation from 4.13125 kHz. to 1.0898 kHz.; and 5) Increase the DMT's sampling rate from 2208 kHz. to 2263 kHz. For simplicity, the example shown in FIGS. 5 and 6 do not show the additional 32 samples for preventing ISI in cyclic prefix (or an increase to 216 samples). Also with the increase in sampling rate, instead of the 69th frame being dedicated to a synch symbol, the 73rd frame may contain frame synchronization information.

With a sampling rate of 2263 KHz., a cyclic prefix of 184 samples is equivalent to a delay of 81.3 $\mu$sec., which exceeds the longest anticipated round-trip delay (80 $\mu$sec) over the twisted-wire pair. It does not account for intersymbol interference (ISI) prevention delay and, to do so, the cyclic prefix should be 216 samples. Also, the above-suggested 1 msec. frame-length (2 msec. for the transmitter/receiver pair) is not likely to be harmful for telephony applications because it is much less than the 10 msec. delay at which quality impairment becomes noticeable in a telephone call. An additional small delay may be introduced by the convolutional codec and/or interleaver shown in FIGS. 2A and 3.

Benefit of Making the Cyclic Prefix Longer than the Maximum Round-trip Delay

In the above example, the DMT receiver in the central office (CO) takes a number of samples (e.g., 2048) inside each received frame, which in this example contains 2232 (=2048+184 samples), as illustrated in FIG. 5.

FIG. 5 shows the frames that a central office modem receives from two subscribers at two extremes of round-trip delay. At one extreme the subscriber is almost adjacent to the central office, so that the leading edge of the subscriber's frame is received 184 samples before the leading edge of the CO modem's sampling, and the subscriber is far distant (for example, 18,000 feet) from the central office, so that the leading edge of the subscriber's frame coincides with the leading edge of the CO modem's sampling. These frames are drawn under the assumption that the leading edges of the subscribers' modems' transmitted frames are aligned with the leading edges of the subscribers' modems' received frames, as described previously.

For all delays between these extremes, FIG. 5 shows that the receiver (FIG. 2B) in the CO's modem takes its samples entirely within both the frame received from its subscriber's modem and the frames transmitted by all modems at the central office.

Making the receiver in the modem at the central office to sample entirely within the frame received from the subscribers' modem guarantees that a frame transmitted at one carrier frequency will not interfere with a frame received at another carrier frequency. This prevention of cross-frequency interference occurs because taking samples from inside the frame preserves the orthogonality of the sinusoids in the DFT, since the modem's DFT operates on an integral number of periods of each carrier frequency. This assumes that distortion and frequency misalignment are small and there is minimal intermodulation, harmonic distortion or sidelobe leakage. This orthogonality is a consequence of the DFT, which can be written as $$\sum_{k=0}^{N-1} \exp\left(-2\pi jk \frac{m-n}{N}\right),$$

where m, n, and N are integers, and where a carrier frequency denoted by m is a potential source of NEXT at a carrier frequency denoted by n, where $j=\sqrt{-1}$. The DFT sums to N when $m=n$, and it sums to 0 when $m \neq n$, showing that two sinusoids at different carrier frequencies are orthogonal to each other. Sidelobes may occur if m is not an integer or when the mth carrier frequency is mistuned but is prevented by synchronizing all central office modem oscillators to a common sinusoid.

Benefit When an Echo-Canceler is Used

The reduction in NEXT which this orthogonality produces is important for a DSL modem which includes an echo canceler that permits all frequencies to be used simultaneously in both directions of transmission. Although this invention does not prevent NEXT between modems when the transmit and receive carrier frequencies are identical, it does prevent NEXT between the much more numerous N(N−1)/2 pairs of N different carrier frequencies. Broadcasting on an adjacent frequency is not heard on the receive freqency at the central office.

Although no reduction in the total amount of NEXT power occurs if all of the modem's carrier frequencies are transmitted at the same power level, it does prevent a strong signal at any given carrier frequency from contributing an excessive amount of NEXT power to a nearby carrier frequency.

Benefit if the Central Office and Subscriber Modems' Transmit Frequencies are Interleaved NEXT is prevented almost entirely if the central office and subscriber modems operate with interspersed transmit frequencies, as described above. The orthogonality described above prevents the signal transmitted by a CO modem from interfering with the signal which that modem receives from the subscriber's modem. Consequently, NEXT is virtually eliminated between modems utilizing this invention.

Similar Benefits for Subscribers' Modems

The above benefits for CO modems also apply to the subscribers' modems. This can be seen from FIG. 6, which demonstrates that a subscriber's modem will sample only inside the frames transmitted by itself and by other subscribers' modems of the same type. As was true for the CO modems, sampling inside the frames preserves the orthogonality of sinusoids at adjacent frequencies. As before, this orthogonality reduces NEXT by preventing a frame transmitted by a subscriber modem at one carrier frequency from interfering with a frame received by another subscriber modem at a different carrier frequency.

Reduction of Leakage-Excited Crosstalk (LEXT) in Both the CO's and the Subscribers' Modems To the extent that an echo canceler fails to prevent a fraction of the modem's transmissions from appearing at the input to its analog-to-digital (A/D) converter, interference occurs that we term Leakage-Excited Cross-Talk (LEXT). This invention reduces LEXT for the same reasons that it reduces NEXT, i.e. because the modem samples the received signal during the interval in which that modem is transmitting a frame (as illustrated in FIGS. 5 and 6), thereby producing orthogonality. The orthogonality prevents transmissions at any given frequnecy from interfering with reception at any other frequency.

Thus, there has been shown and described a method and apparatus for reducing near end crosstalk and leakage-excited crosstalk caused by one central office discrete multitone modem's interfering with the transmission of a signal by another modem, for example, using proximate twisted wire cable pairs in the same cable. The ANSI T1.413-1995 standard referenced herein should be incorporated by reference as to any subject matter deemed material to an understanding of the present invention whose scope should only be deemed to be limited by the claims which follow.

What we claim is:

1. A method for reducing crosstalk when communicating between a subscriber and a central office using Discrete Multitone (DMT) modems, comprising,     aligning all modem frames transmitted from said central office to said subscriber;

sufficiently aligning all modem frames received at said central office from said subscriber;

aligning transmitted frames with received frames at the subscriber's modem;

lengthening all frames by adding a cyclic prefix to frames transmitted from said central office,     said cyclic prefix having a duration at least equal to a maximum round trip delay between said central office and said subscriber; and     reducing carrier spacing proportionately to an increase in the cyclic prefix.

2. A method as recited in claim 1 further comprising the step of interspersing the central office and subscribers' modems' transmit frequencies.

3. The method of claim 1 further comprising the step of synchronizing said central office modem and said subscriber modem connected to said central office modem to the same reference frequency.

4. The method of claim 1 wherein the step of lengthening a frame comprises lengthening the frame in approximate proportion to said lengthened cyclic prefix to increase the length of time during which data is transmitted.

5. The method of claim 2 wherein said interspersing step comprises providing groups of carrier frequencies for downstream transmission different from groups of frequencies for upstream transmission.

6. The method of claim 2 wherein said interspersing step comprises transmitting all odd integer carrier frequencies in one direction of transmission and all even integer carrier frequencies in the other direction of transmission.

7. The method of claim 1 comprising the step of further lengthening said cyclic prefix to compensate for intersymbol interference.

8. Apparatus for reducing crosstalk when communicating between a subscriber and a central office using Discrete Multitone (DMT) modems, comprising,     means for aligning all modem frames transmitted from said central office to said subscriber;

means for sufficiently aligning all modem frames received at said central office from said subscriber;

means for aligning transmitted frames with received frames at the subscriber's modem;

means for lengthening all frames by adding a cyclic prefix to frames transmitted from said central office, said cyclic prefix having a duration at least equal to a round trip delay between said central office and said subscriber, and means for reducing the carrier spacing proportionately to an increase in the cyclic prefix.

9. Apparatus as recited in claim 8 further comprising means for interspersing the central office and subscribers' modems' transmit frequencies.

10. The apparatus of claim 8 further comprising means for synchronizing said central office modem and said subscriber modem connected to said central office modem to the same reference frequency.

11. The apparatus of claim 8 wherein said means for lengthening a frame comprises means for lengthening the frame in approximate proportion to said lengthened cyclic prefix to increase the length of time during which data is transmitted.

12. The apparatus of claim 9 wherein means for interspersing comprises providing groups of carrier frequencies for downstream transmission different from groups of frequencies for upstream transmission.

13. The apparatus of claim 9 wherein said means for interspersing comprises means for transmitting all odd integer carrier frequencies in one direction of transmission and all even integer carrier frequencies in the other direction of transmission.

14. The apparatus of claim 8 wherein said cyclic prefix has a length further including a duration sufficient to compensate for intersymbol interference.

15. A method of reducing crosstalk in a discrete multitone modem communication system between a central office and a subscriber comprising the steps of aligning all modem frames transmitted from said central office to said subscriber;

aligning transmitted frames with received frames at the subscriber's modem;

lengthening all frames transmitted from a subscriber's modem with a cyclic prefix; and sampling entirely within frames received from the subscriber's modem at the central office.

16. A method as recited in claim 15 further comprising the step of transmitting all carrier frequencies from a discrete multitone carrier modem at the same power level.

17. A method as recited in claim 15, the central office having plural discrete multitone carrier modems, further comprising the step of synchronizing said plural discrete multitone carrier modems to a common sinusoid.

18. A method as recited in claim 17 wherein said synchronization step comprises generating a source of narrow pulses spaced by the period of the frame and generating a source of higher-frequency signal.

19. A method as recited in claim 18 wherein said higher-frequency signal comprises a pulse train at a sampling frequency for symbols.

20. A method as recited in claim 18 wherein said higher-frequency signal comprises a pilot frequency.

21. A method as recited in claim 1, the central office having plural discrete multitone carrier modems, further comprising the step of synchronizing said plural discrete multitone carrier modems to a common sinusoid.

22. A method as recited in claim 21 wherein said synchronization step comprises generating a source of narrow pulses spaced by the period of the frame and generating a source of higher-frequency signal.

23. A method as recited in claims 22 wherein said higher-frequency signal comprises a pulse train at a sampling frequency for symbols.

24. A method as recited in claim 22 wherein said higher-frequency signal comprises a pilot frequency.

25. Apparatus as recited in claim 8 the central office having plural discrete multitone carrier modems, further comprising synchronization means for synchronizing said plural discrete multitone carrier modems to a common sinusoid.

26. Apparatus as recited in claim 25, wherein said synchronization means comprises a source of narrow pulses spaced by the period of the frame and a source of higher-frequency signal.

* * * * *